United States Patent [19]
Endo et al.

[11] Patent Number: 5,123,077
[45] Date of Patent: Jun. 16, 1992

[54] LIGHT SOURCE DEVICE

[75] Inventors: Syuusuke Endo; Naofumi Aoyama; Toshihiko Yabuuchi, all of Mobara, Japan

[73] Assignee: Hitachi, Ltd., Tokyo, Japan

[21] Appl. No.: 496,301

[22] Filed: Mar. 20, 1990

[30] Foreign Application Priority Data

Mar. 20, 1989 [JP] Japan ................................ 1-66145

[51] Int. Cl.$^5$ ................................................. G02B 6/10
[52] U.S. Cl. ....................................... 385/129; 385/901
[58] Field of Search ............... 350/96.10, 96.11, 96.12, 350/96.24, 96.28; 362/32; 385/129, 146, 901

[56] References Cited

U.S. PATENT DOCUMENTS

| | | | |
|---|---|---|---|
| 4,382,656 | 5/1983 | Gilby | 350/96.28 |
| 4,447,118 | 5/1984 | Mulkey | 350/96.16 |
| 4,883,333 | 11/1989 | Yanez | 350/96.10 |

*Primary Examiner*—Frank Gonzalez
*Attorney, Agent, or Firm*—Antonelli, Terry, Stout & Kraus

[57] ABSTRACT

The present invention relates to a light source device and particularly to a light source device which can be applied to a light source apparatus of a liquid crystal display apparatus which utilizes a flat plane type light source. The present invention provides a large size, light weight and thin flat plane light source which ensures uniform high level brightness to the entire part of display panel.

8 Claims, 8 Drawing Sheets

LIGHT SOURCE DEVICE

BACKGROUND OF THE INVENTION

1. Field of the Invention

The present invention relates to a light source device and more particularly to the techniques to be effectively applied to a light source device of the type used in a liquid crystal display apparatus which requires a flat plane type light source.

2. Description of the Prior Art

An example of the flat plane type light source device of the prior art is described in the U.S. Pat. No. 4,059,916. As shown in FIG. 8, a light source 4B is arranged at the one end part of a light guiding material 4A, the light guiding material 4A is formed by a material which efficiently transmits the light, the one surface 4a in the observing side of which is formed as a smooth surface, while the other surface 4b is provided as a rough surface. The rough surface 4b diffuses the light emitted from the light source 4B and reflects the light emitted from the light source 4B to the smooth surface 4a. The light guiding material 4A is formed as shown with a sloping plane so that it becomes thinner as it extends from the light source 4B.

In the prior art, the transparent board gradually becomes thinner, as shown in FIG. 8, as the coordinate X increases and a flat plane type light source is attained by providing a light source 4B, for example, a fluorescent lamp, at the one end face of the light guiding element 4A. Therefore, (a) a single Unit of fluorescent lamp is used, as shown in FIG. 8, for a flat plane type light source of comparatively small area, and (b) at pair of fluorescent lamps are provided vertically at the end face, as seen in FIG. 9, in order to attain a large area and high brightness flat plane type light source. However, in the prior art, the light source (a) is thin and light weight but is not suited for high brightness and large size display, while the light source (b) provides high brightness and large size display but is difficult to realize as a thin and light-weight display apparatus. A light source of this kind is also disclosed, for example, in U.S. Pat. No. 4,487,481.

A flat plane type light source of another type comprising a light guiding material is disclosed in International Publication Number WO83/03013. This example is shown in FIG. 10 and FIG. 11. FIG. 10 is a disassembled perspective view of the display section and light source section, while FIG. 11 shows the unit assembled as a display. In FIG. 10, 4A designates a light guiding material and the end parts thereof are provided with a holes 15 formed to accommodate point type light sources 14B. This light guiding material has a flat light emitting side 4a and becomes thinner as it goes near the center from the end part. But the curved surface 4b to determine the thickness of the light guiding material is not disclosed. Moreover, the surface treatment for the light guiding material is not disclosed. A similar light guiding material is also disclosed in U.S. Pat. No. 4,641,925, but in this case, there is no description as to the manner of changing the thickness of the light guiding material or the surface treatment thereof. The light sources disclosed in the patents listed above may be considered to be used for only a small area display, judging from the objects thereof.

SUMMARY OF THE INVENTION

It is an object of the present invention to provide techniques for attaining a large area, light-weight and thin flat plane-type light source which further ensures uniform high brightness for the entire part of the display screen.

This object can be achieved as follow. Namely, in a light source device having rod type light sources arranged at both end sections of the light guiding element, the surface on the side of the observer of the light guiding element, namely the surface from which the light is emitted, is formed as a curved surface, while the opposite surface from which the light is reflected is formed as a flat surface. Moreover, the flat surface is provided with a reflection layer having a high lightness (having a high L* value (lightness index in the color system of ULCS table of CIE) which ensures sufficient light for the observer. When an observer sees the light guiding material in a section at right angle to the rod type light sources, the surface is formed as a concaved surface on the light emitting side at the center thereof and both sides are formed as convex surfaces on the light emitting side.

This effect can further be enhanced by the surface treatment for the transparent substrate, namely by changing the roughness of the surface depending on the regions.

In one method, the surface on the observer side, namely the surface at the light emitting side, is formed as a concave surface toward the light emitting side and having a fine roughness, while the curved surfaces on both sides are formed as a surface having coarse roughness. In this case, the flat surface on the reflecting side may be formed as a mirror-surface or a surface having roughness.

In another method, the surface on the light emitting side is formed as a surface having uniform roughness and the region corresponding to that which is concave toward the light emitting side of the surface on the light emitting side is formed as a rough surface for the flat plane of the reflecting side and the other region has coarse roughness.

According to the arrangement mentioned above, a large size flat plane light source having high brightness can be obtained by arranging the light sources on both sides thereof. Moreover, a space is formed between the inclined and curving surface and the uniform diffusion layer formed above the thinnest part and an inclined and curving surface of light guiding material by providing such inclined and curving surface on the observer side, and therefore interference fringes of light generated by the light guiding material and diffusion plate can be prevented.

Moreover, if non-uniformity of brightness is (generated due to the lights of the light sources provided on both sides being combined, such non-uniformity may be compensated by a difference of roughness at the surface of the light guiding element. Accordingly, a thin, light weight and large size flat plane type light source can be obtained. As a result, a liquid crystal display apparatus utilizing such light source device ensures display of clear images.

DETAILED DESCRIPTION OF THE INVENTION

Figure 1:
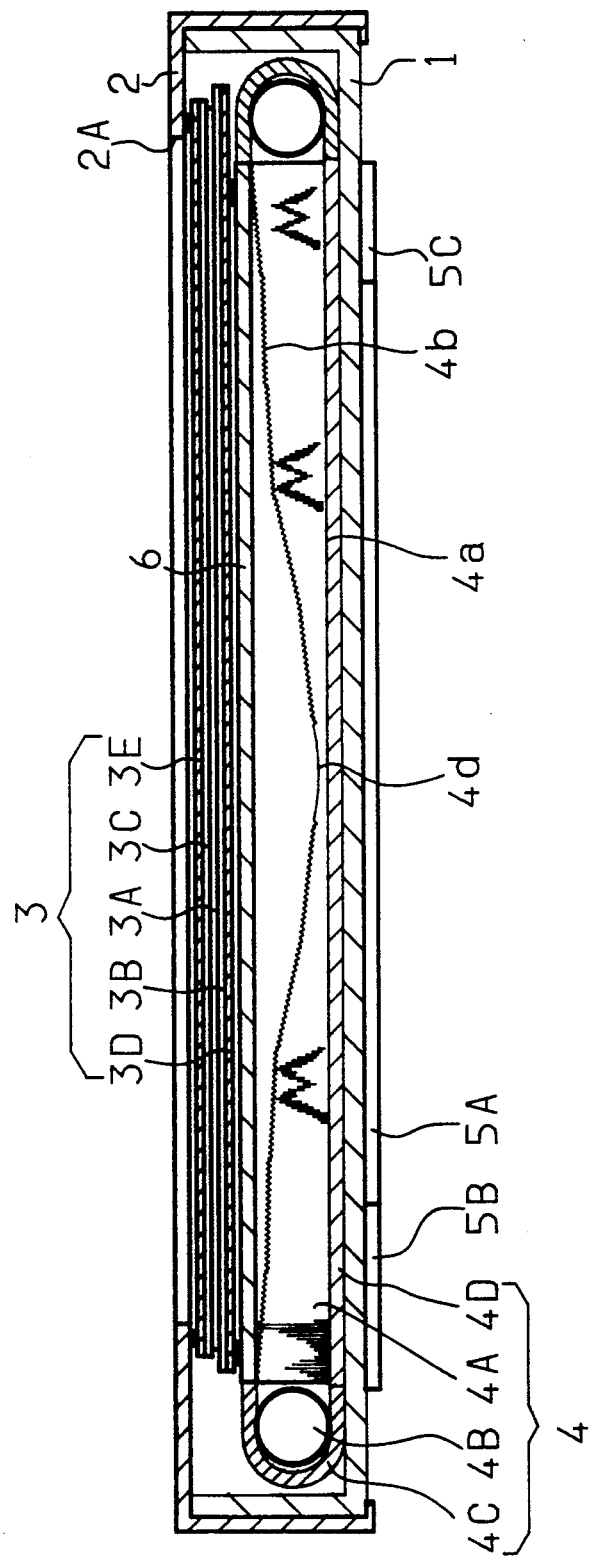
FIG. 1 is a sectional view of a liquid crystal display device using a light source device as an embodiment of the present invention.

An example of the structure of the present invention will be explained by reference to an embodiment thereof in which the present invention is applied to a light source device for use in a liquid crystal display apparatus.

Like elements are designated by like reference numerals throughout the drawings and repetition of explanation will be avoided.

Figure 2:
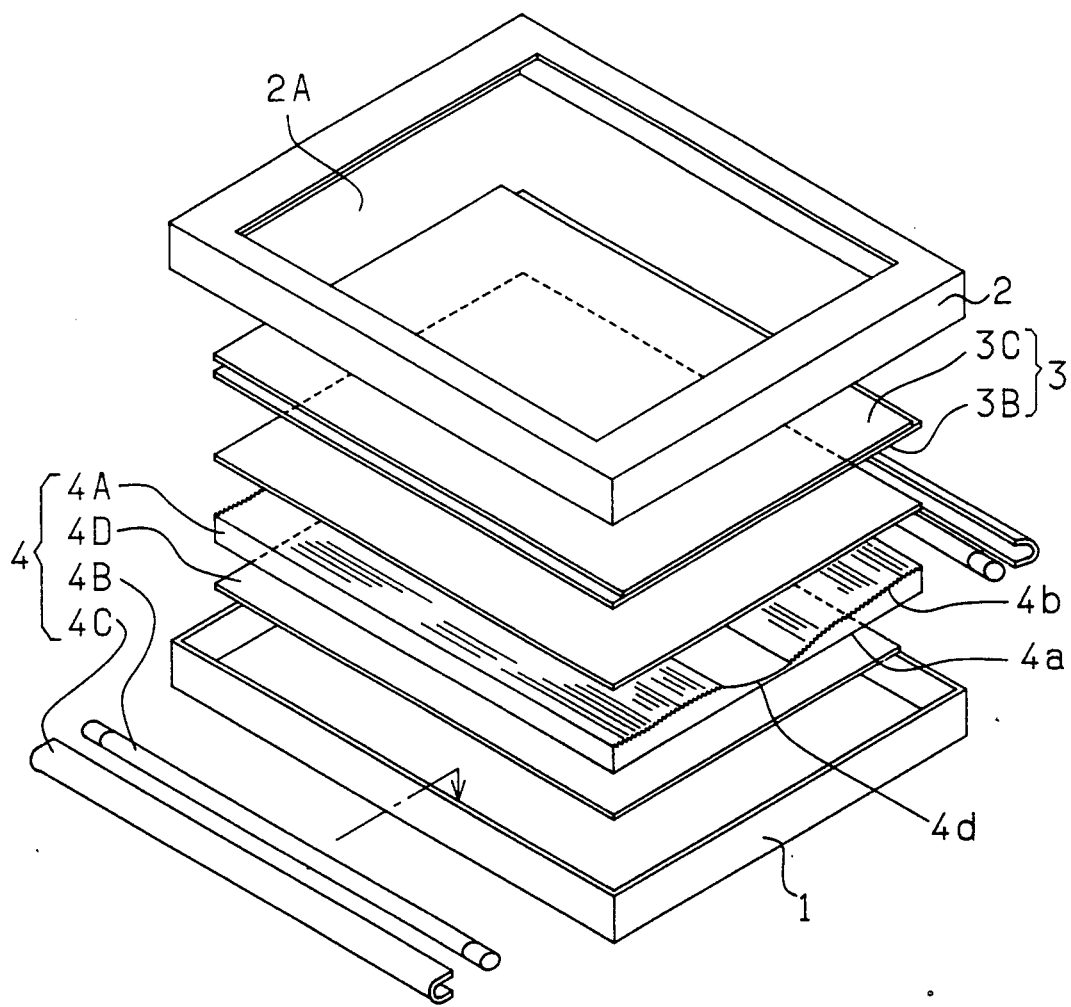
FIG. 2 is a disassembled perspective view of structure where a light source device of the present invention is applied to a liquid crystal display apparatus.

A liquid crystal display apparatus and a light source device for use therein as an embodiment of the present invention are shown in FIG. 1 (sectional view) and FIG. 2 (disassembled perspective view).

As shown in FIG. 1 and FIG. 2, a liquid crystal display apparatus provides a liquid crystal display panel 3 and a light source device 4 within the interior of a housing defined by a lower frame (mold case) 1 and an upper frame (cover) 2.

The mold case 1 is square-shaped and is formed for example of resin material. The cover 2 is also square-shaped, engaging with the mold case 1. The cover 2 is provided with an opening 2A at the center thereof. The opening 2A is formed to expose the liquid crystal display panel 3. The cover 2 is formed, for example, of a metal material, such as iron or an aluminum alloy, or a resin material.

Although not illustrated in detail, the liquid crystal display panel 3 is formed by a dot matrix type panel to be driven on a time sharing basis or TFT. The liquid crystal display panel 3 is provided with a liquid crystal part 3A between a lower transparent glass substrate 3B and an upper transparent glass substrate 3C. The liquid crystal part 3A is filled with the liquid crystal restricted by an orientation film formed respectively on the internal (liquid crystal side) surface of the lower transparent glass substrate 3B and upper transparent glass substrate 3C. As the liquid crystal of this liquid crystal part 3A, a twisted nematic type liquid crystal is used. The liquid crystal of liquid crystal part 3A is controlled for lighting and display by a scanning electrode formed on the internal surface of lower transparent glass substrate 3B and a display electrode formed at the internal surface of the upper transparent glass substrate 3C. The external surface of lower transparent glass substrate 3B is provided with a polarizing plate 3D, while the external surface of upper transparent glass substrate 3C is provided with a polarizing plate 3E, respectively.

Figure 3:
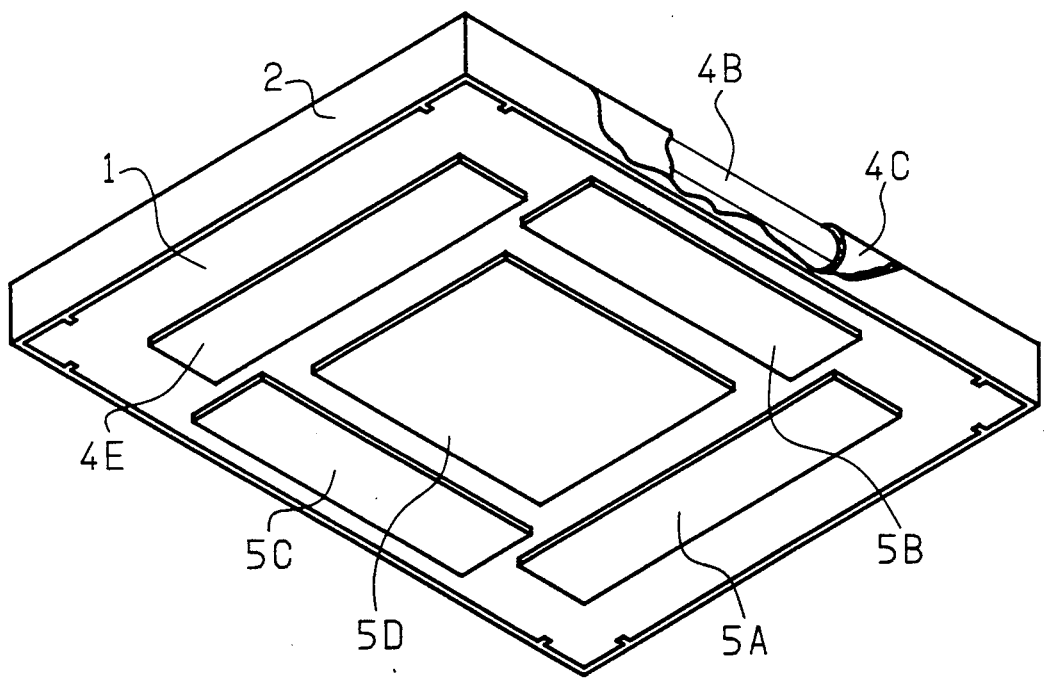
FIG. 3 is a perspective view of the rear side of a liquid crystal display apparatus as an embodiment of the present invention.

As shown in FIG. 3 (a perspective view of a liquid crystal display apparatus observed from the lower side thereof), the display electrode is driven by segment driver circuits 5B and 5C removably fitted to the bottom part of mold case 1. The display electrode of liquid crystal display panel 3 of this embodiment is divided into two sections and therefore segment driver circuits 5B and 5C are provided. Each of the segment driver circuits 5B, 5C is formed by a wiring substrate (for example, glass epoxy resin) mounting a semiconductor device for a segment driver.

The scanning electrode is driven by a common driver circuit 5A removably fitted to the bottom part of the mold case 1. Like the segment driver circuits 5B and 5C, this common driver circuit 5A is formed by wiring substrate mounting semiconductor devices. 5A are respectively driven by the power supply circuit for driving the liquid crystal (LCD) and the timing generation circuit. The liquid crystal driving circuit 5D is also formed by wiring substrate mounting semiconductor devices and passive elements, such as resistors and capacitors.

As shown in FIG. 1 to FIG. 3, the light source device 4 is mainly composed of a light guiding elements 4A, light sources 4B, a reflecting plate 4C for light source, a reflecting plate 4D and an inverter power supply circuit 4E. This inverter power supply circuit 4E is sometimes not built into the liquid crystal module.

Figure 4:
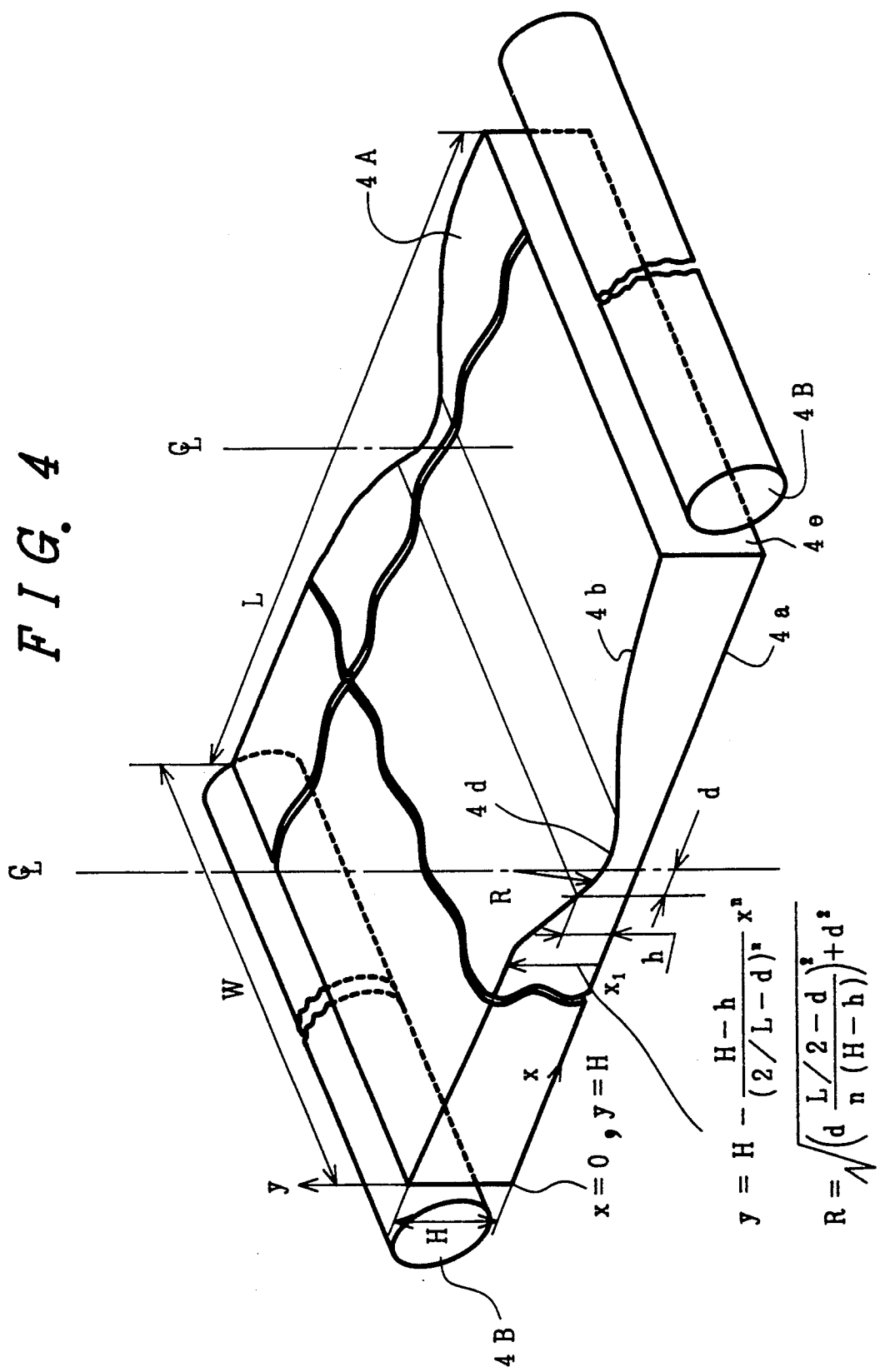
FIG. 4 is a perspective view indicating the essential portion of a light source device as an embodiment of the present invention.

As shown in FIG. 4 (a perspective view observed from the inclined upper direction of the light guiding element), the light guiding element 4A is formed with a square shape of transparent material having a predetermined light transmissivity. The light guiding element 4A is formed by an acrylic resin having light transmissivity of about 90–95[%]. Moreover, the light guiding element 4A may also be formed of a transparent glass material. In this embodiment, the width W of the light guiding element 4A is 250 [mm]. The length L of the light guiding element 4A is 160 [mm]. The thickness H of the light guiding element 4A is 4–9 [mm]. In this case, one surface of light guiding element 4A on the side of reflecting plate 4D of light guiding material is substantially formed by a flat and smooth surface 4a. The other surface opposed to the smooth surface 4a of the light guiding element 4A is formed by rough surfaces 4b and 4d. The rough surface 4b is rougher than the rough surface 4d. The rough surface 4b is formed, for example, by a mat processing corresponding to sandpaper No. #40–400, or more desirably to corresponding to sandpaper No. #40–400, or more desirably to #80–200, while the rough surface 4d, is formed by mat processing corresponding to sandpaper No. #500–4000, or more desirably to #1000–2000.

In case the lines are formed in the longitudinal direction of the light source 4B, it is more desirable from the point of view of the light diffusion of the rough surfaces 4b and 4d of the light guiding element 4A have a directivity like a hairline, than the case where the lines are formed in a direction crossing the light source. But, a similar effect can be obtained through mat processing even without providing such directivity. In case the light guiding element is formed by an injection molding method, formation of mat surface controls more easily the degree of roughness (pitch of mat and depth of groove) and ensures higher moldability, namely it is more desirable from the point of view of flexibility of processing.

The light emitting surfaces 4b and 4d of the light guiding element 4A are formed as a particularly curved surface, namely through combination of a surface which is convex toward the light emitting side and a surface which is concave toward the light emitting side so that the light is uniformly emitted over the entire surface of the light guiding element. This is shown in FIG. 4. As shown in FIG. 4, the surface is concave upward at the center while it is convex upward at both sides thereof.

When the thickness of the curved surface which is convex upward is defined as Y, $$Y = H - \frac{H - h}{(L/2 - d)^n} X^n \quad (1)$$

$$0 \leq X \leq L/2 - d$$

Where,
Y: plate thickness of light guiding material;
H: plate thickness of light guiding material at both ends
h: plate thickness of light guiding material at the inflexion point where the convexed surface changes to the concaved surface;
L: distance between both ends where the light sources of light guiding material are arranged;
X: distance toward the center line from the end surface of light guiding material;
d: distance of the inflexion point from the center line of section of light guiding material;
n: constant between 1.5-3.5

The surface which is concave upward is continuous to the surface which is convex upward and is formed by a cylindrical surface. When the radius of curvature of the cylindrical surface is defined as R, $$R = \sqrt{\left(d \frac{L/2 - d}{n(H - h)}\right)^2 + d^2} \quad (2)$$

$$(L/2 - d \leq X \leq L/2)$$

where, each symbol means the same as that used in formula (1).

Here, each constant must be determined adequately depending

Here, each constant must be determined adequately depending on the size of the light sources, but is set, for instance, generally as indicated below. When the diameter of light source 4B is set to 0.6 mm, H is set to 6.0-9.0 mm or desirably to 7.0-8.0 mm; h, to 1.0-4.0 mm or desirably to 1.5-2.5 mm; L to 100-300 mm, although determined depending on the size of the light source device to be realized; d, to 2.0-6.0 mm or desirably to 3.0-5.0 mm; moreover n, to 1.5-3.5 or desirably to 2.0-3.0 for obtaining a good result.

The combination of such surfaces provides a substantially uniform distribution of brightness.

However, since the light is concentrated from both ends of the substrate to the area near the center of the light guiding element, the brightness becomes comparatively high at the center thereof and it sometimes results in a problem. As described previously, in order to overcome such problem, the entire surface is not formed with the same roughness on the light emitting side of the light guiding element, but the area near the center is formed as a fine surface and the remaining surface is formed as a rough surface. The surface of the light guiding element is formed as a rough surface in order to scatter the light at this surface. When the degree of roughness is small, less light is scattered. The light is refracted in such amount and is emitted toward the other region. Accordingly, when the degree of roughness at the center is set to a small value, the light is emitted toward a region other than the center area. As a result, the brightness at the center is suppressed and a light source ensuring a more uniform brightness can be obtained. This explanation is based on a structure in which the fine roughness is formed on a surface which is concave toward the light emitting direction of the light guiding element and the surface having coarse roughness is formed as a surface convexed which is convex toward the light emitting direction thereof. However, the size of the region formed by the surface having fine roughness is not limited to this configuration and this region may be smaller or larger than the concave surface on the light emitting side depending on various cases. Moreover, it is not required to clearly define the boundary between the surfaces having fine roughness and coarse roughness and so the degree of roughness may be changed continuously.

Figure 5:
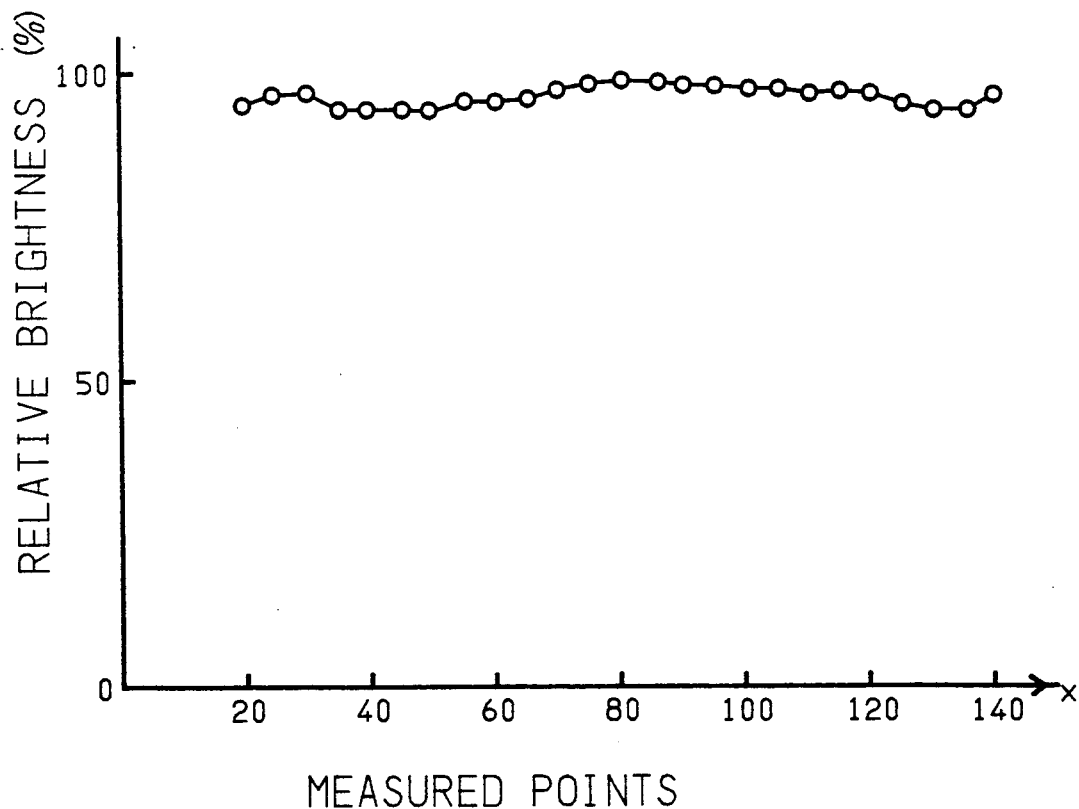
FIG. 5 is a graph indicating brightness characteristics by an embodiment of the present invention.

FIG. 5 shows the distribution of brightness using a light source of the present invention. In this experiment, L=160 mm, H=7 mm, h=1.6 mm, d=3.0 mm, n=2.3 and the diameter of light source 4B is 6 mm. The brightness distribution in the plane is within 15% and sufficient brightness for practical use can be obtained.

Figure 6:
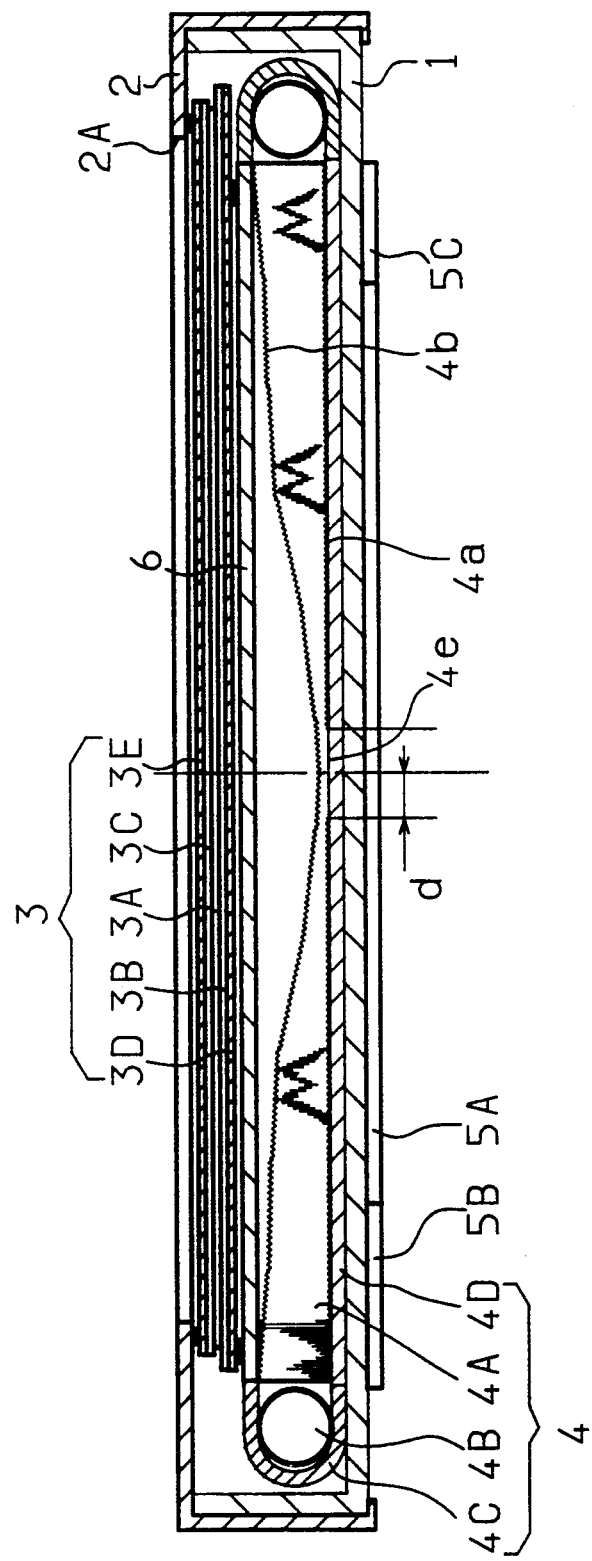
FIG. 6 is a sectional view of a light source device in another embodiment of the present invention.

FIG. 6 shows another embodiment of the present invention in which like elements are designated by like reference numerals. In FIG. 6, a uniform rough surface is formed in the light emitting side 4b of the light guiding element 4A and the surface 4e having fine roughness is formed as an area near the center at the flat area of the light reflecting side. Moreover, a surface 4a having comparatively coarse roughness is formed on both sides. Since the surface 4e has a small degree of roughness, the quantity of light reflected by the mirror surface increases and the light emitted toward the other region from the area near the center also increases. As a result, the brightness at the center is suppressed and a light source providing more uniform brightness can be attained. In FIG. 6, the area in which the surface having fine roughness formed for the opposite surface is formed corresponding to the surface which is concave toward the light emitting side of the light emitting surface. However, the region in which the surface having fine roughness is formed is not restricted to what is shown by FIG. 5, and the region in which the surface has fine roughness may be wide or narrow depending on respective cases. Moreover, it is not required to clearly define the boundary between the surfaces having fine roughness and coarse roughness and so the roughness may be changed continuously.

The parts other than the light guiding element of the light source device will now be explained.

The light source 4B is arranged at one end part of the light guiding material 4A. As the light source 4B, for example, a cold cathode tube having a length of about 270 [mm] is used. This cold cathode tube is driven by an inverter power supply circuit 4E fitted to the bottom part of the mold case 1. This inverter power supply circuit 4E is formed to convert, for example, the DC power supply voltage of 5-30 [V] to the AC power supply of 30-50 [khz] in the voltage of 300-400 [V]. The inverter power supply circuit 4E is formed by a wiring substrate mounting semiconductor devices like the circuits 5A-5D.

Figure 7:
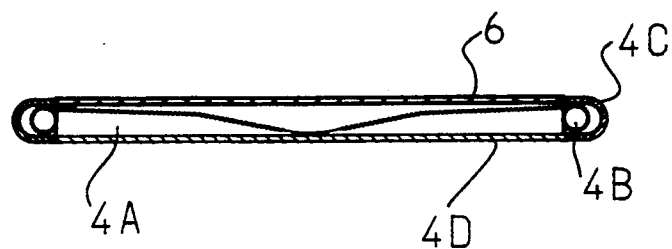
FIG. 7 is a sectional view of the essential portion of a light source device in still another embodiment of the present invention.
Figure 8:
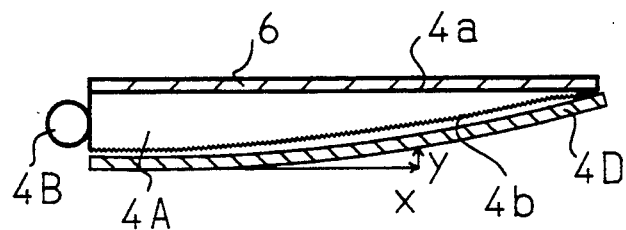
FIGS. 8, 9 are sectional views indicating the light source devices of the prior art.
Figure 9:
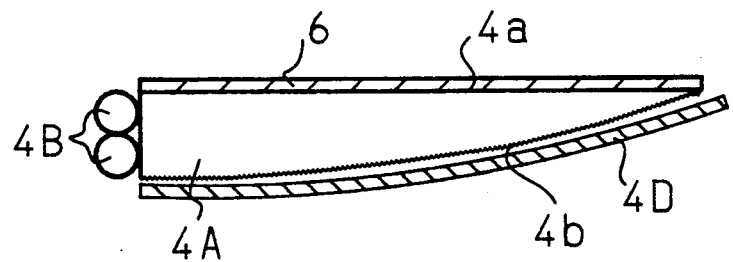
Figure 10:
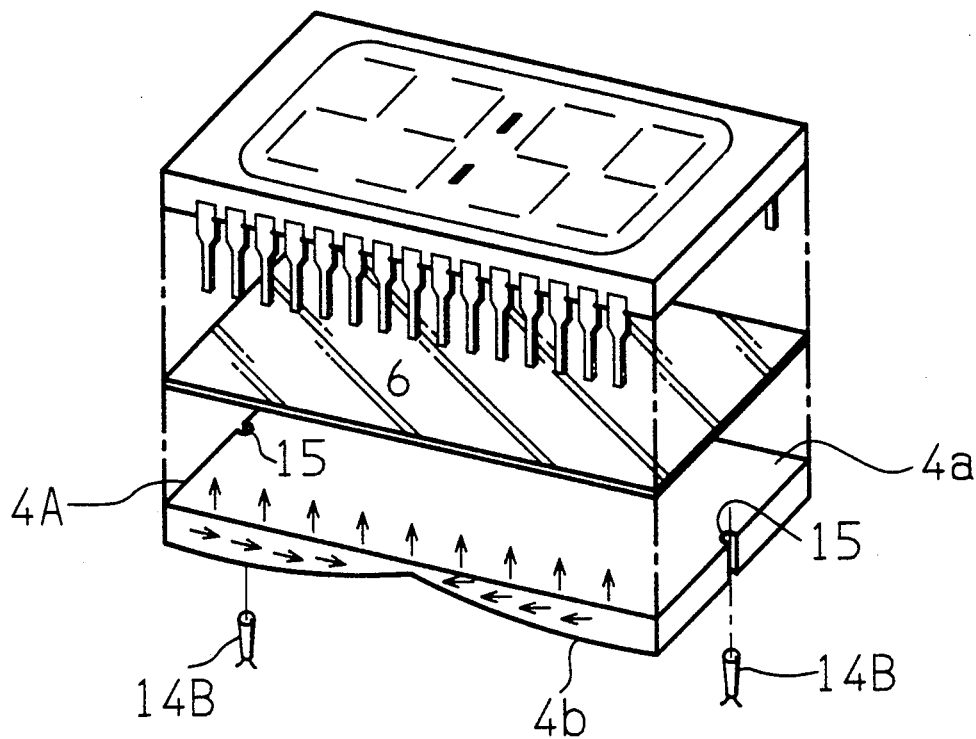
FIG. 10 is a disassembled perspective view of a display apparatus utilizing the light source device of other prior art.
Figure 11:
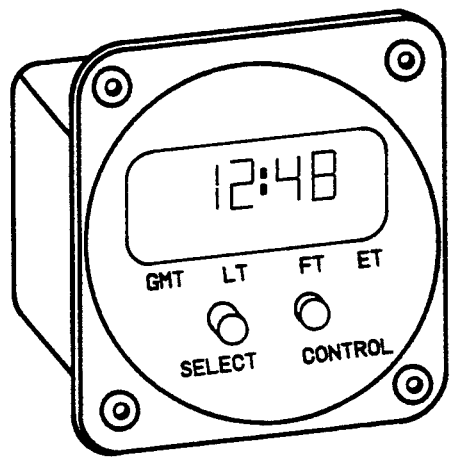
FIG. 11 is an assembled structure of a display apparatus shown in FIG. 10.

The reflecting plate 4C for the light source covers the light source 4B except for a part thereof and has a section in the form of a character ⊐ or U so that the light emitted by the light source 4B is reflected efficiently in the direction of light guiding element 4A. This reflecting plate 4C for the light source is formed, for example, by an aluminum plate having a surface (the surface on the side of the light source 4B) is coated with white paint (acrylic resin paint) and the value of lightness (L* value) must be 90 or more and possibly 94 or more. The reflecting plate 4C for the light source may be formed by perfectly covering the light source with a metal-evaporated sheet having high reflectivity for the light guiding material 4A as shown in FIG. 7. In this case, the leakage of light flux can be minimized and an improvement in the brightness can be expected. Meanwhile, the former is considered preferable from the point of view of flexibility of assembling and easiness of replacement. The reflecting plate 4D is formed on the side of the smooth surface 4a of the light guiding material 4A so that the light of light source 4B is efficiently reflected toward the liquid crystal display panel 3. This reflecting plate 4D on the substrate is formed, for example, by a material similar to that used for reflecting plate 4C for the light source. In this case, the higher lightness value (L* value) of the reflecting plate is preferable and 94 or a higher value is desirable.

A light diffusing plate 6 is provided between the liquid crystal display panel 3 and the light guiding element 4A of the light source device 4. The light diffusing plate 6 is formed, for example, by a half-transparent acrylic resin. This acrylic resin has a total light transmissivity of 40-80% and diffused light transmissivity of 40-80% and the desirable resin should have a thickness of about 0.5-3.0 [mm] and have the roughness processing applied on both sides because it has the function to prevent generation of Newton's rings at the LCD surface or the surface in contact with the light guiding material.

The present invention can achieve an effect similar to that described above by forming the rough surface 4b of the light guiding element 4A of light source device 4 with a continuous curved surface (partially curved surface) extending from a position spaced by a predetermined distance from the light source 4B.

The present invention permits the light source 4B of light source device to be formed by a fluorescent lamp. Moreover, when the size L is small (for example, less than 50 [mm]), the light source 4B may be formed by a plurality of LEDs.

In addition, it is possible to increase the brightness by arranging a plurality of light sources at each end part of the light guiding element 4A.

Since the light source device 4 of the present invention provides at high brightness, it is effective to form the liquid crystal display panel 3 of liquid crystal display apparatus in the super-twisted nematic type white & black mode (having less light transmissivity).

While the invention has been particularly shown and described with reference to a preferred embodiment thereof, it will be understood by those skilled in the art that the foregoing and other changes in form and details may be made therein without departing from the spirit and scope of the invention.

For example, the present invention can be applied to a light source device for use in a liquid crystal display apparatus which uses an active matrix system forming a pixel with a thin film type transistor and transparent pixel electrode.

Moreover, the present invention can also be applied to a light source device of a wrist watch or measuring instrument, namely to every kind of light source apparatus which requires a flat plane type light source.

The typical effect of the invention is disclosed in this specification can be briefly concluded as that the brightness of a flat plane type light source device can be equalized over the entire area.

What is claimed is:

1. A light source device comprising a light guiding element formed by a transparent medium having a particular refractive index and a pair of rod type light sources respectively arranged along two opposed end faces of the light guiding element;

said light guiding element having a sectional view taken at right angles to said end faces, in which sectional view both end portions to which the light enters from said light sources are relatively thick, the center thereof is relatively thin and the bottom surface thereof is flat, while the surface opposite the bottom surface is a light emitting surface which is concave in a light emitting direction away from said bottom surface at a center region and convex in the light emitting direction in regions on either side of said center region.

2. A light source device according to claim 1, wherein part of said light emitting surface of said light guiding element has a fine roughness and the remaining part of said light emitting surface has a coarse roughness, said part having a fine roughness being located over at least a portion of said center region.

3. A light source device according to claim 2, wherein the degree of roughness in the light emitting surface of the light guiding element continuously changes from coarse roughness to fine roughness from the end faces toward the center thereof.

4. A light source device according to claim 2, wherein the bottom surface of said light guiding element has fine roughness in a central area thereof and a coarse roughness outside said central area.

5. A light source device according to claim 4, wherein the degree of roughness in the bottom surface of the light guiding element changes continuously from a fine roughness to a coarse roughness from the center thereof toward the end faces.

6. A light source device according to one of claims 1 to 5, wherein said rod type light source is arranged in plural at each end face of two sides.

7. A light source device according to claim 1, wherein the bottom surface of said light guiding element has fine roughness in a central area thereof and a coarse roughness outside said central area.

8. A light source device according to claim 7, wherein the degree of roughness in the bottom surface of the light guiding element changes continuously from a fine roughness to a coarse roughness from the center thereof toward the end faces.

* * * * *